United States Patent
Feve et al.

(10) Patent No.: US 8,031,749 B2
(45) Date of Patent: Oct. 4, 2011

(54) PASSIVELY Q-SWITCHED MICROLASER WITH CONTROLLABLE PEAK POWER DENSITY

(75) Inventors: Jean-Philippe Feve, Le Touvet (FR); Nicolas Landru, Meylan (FR)

(73) Assignee: JDS Uniphase Corporation, Milpitas, CA (US)

( * ) Notice: Subject to any disclaimer, the term of this patent is extended or adjusted under 35 U.S.C. 154(b) by 10 days.

(21) Appl. No.: 11/532,697

(22) Filed: Sep. 18, 2006

(65) Prior Publication Data

US 2007/0064747 A1    Mar. 22, 2007

Related U.S. Application Data

(60) Provisional application No. 60/718,780, filed on Sep. 20, 2005.

(51) Int. Cl.
*H01S 3/11* (2006.01)
(52) U.S. Cl. ............... 372/10; 372/11; 372/50.1
(58) Field of Classification Search ........... 372/10, 372/11, 50.1
See application file for complete search history.

(56) References Cited

U.S. PATENT DOCUMENTS

| | | | | |
|---|---|---|---|---|
| 4,395,769 A | * | 7/1983 | Damen et al. | 372/7 |
| 5,251,193 A | * | 10/1993 | Nelson et al. | 369/44.12 |
| 5,303,256 A | | 4/1994 | Sumida | 372/106 |
| 5,394,413 A | * | 2/1995 | Zayhowski | 372/10 |
| 5,414,724 A | * | 5/1995 | Zhou et al. | 372/10 |
| 6,466,593 B1 | | 10/2002 | Fukumoto | 372/10 |
| 6,668,004 B2 | | 12/2003 | Peterson | 372/92 |
| 6,842,466 B1 | | 1/2005 | Tam et al. | 372/25 |
| 2003/0039274 A1 | | 2/2003 | Neev et al. | 372/10 |
| 2005/0078719 A1 | * | 4/2005 | Masuda | 372/29.02 |

FOREIGN PATENT DOCUMENTS

| | | | | |
|---|---|---|---|---|
| EP | 0508406 | | 10/1992 | 3/109 |
| JP | 07131102 A2 | | 5/1995 | |

OTHER PUBLICATIONS

Fève et al, "Triggering passively Q-switched microlasers," in Advanced Solid-State Photonics, C. Denman, ed., vol. 98 of OSA Proceedings Series (Optical Society of America, Washington, D.C., 2005), pp. 373-378.

* cited by examiner

*Primary Examiner* — Kinam Park
(74) *Attorney, Agent, or Firm* — Matthew A. Pequignot; Pequignot + Myers LLC

(57) ABSTRACT

Geometrical design of laser microchips is disclosed that allows variation of the optical path length in the different media by simple displacement of the microchip, the movement having a non-zero projection orthogonal to the pump beam. The concept can be implemented to vary optical loss in the lasing cavity, the absorbed pump power, or the optical length of the cavity. Passively Q-switched microchip laser output performance can thus be controlled by simple transverse displacement of the microchip relative to the pump beam. The above microlaser can be combined with voltage-controlled variable-focus output optics in order to control the peak power density of the laser pulses.

19 Claims, 14 Drawing Sheets

PASSIVELY Q-SWITCHED MICROLASER WITH CONTROLLABLE PEAK POWER DENSITY

CROSS REFERENCE TO RELATED APPLICATIONS

This application claims priority of U.S. Provisional Patent Application No. 60/718,780 filed Sep. 20, 2005, entitled "A modular passively q-switched microlaser with controllable peak power density, coaxial package platform and assembly process" which is incorporated herein by reference for all purposes.

FIELD OF THE INVENTION

The present invention relates to pulsed microchip lasers, in particular those having tunable output performance based on variably filled cavity and variable-focus optics.

BACKGROUND OF THE INVENTION

Passively Q-switched microchip lasers have many advantages: they allow the realization of low-cost, compact and robust laser sources. Because of the short cavity length, they are capable of generating pulses with high peak power, which are particularly convenient for generation of harmonics (e.g. ultraviolet lasers). High peak power is of primary interest for many applications such as marking, excitation of fluorescence, ionization of solids such as matrix-assisted laser desorption ionization (MALDI) for proteomics, long distance time-of-flight ranging, generation of supercontinuum, and others.

As is known from prior art, the output performance parameters (pulse duration, energy, and repetition rate) of passively Q-switched lasers based on saturable absorbers depend primarily on the design of the microchip laser cavity. These include the optical path length through the different materials, magnitude of gain in the active medium, saturable and non-saturable losses, output coupling, length of the cavity. According to basic laser equations, the main trends are:
   the repetition rate depends linearly on the ratio of the pump power intensity to the laser threshold intensity;
   the pulse energy is directly proportional to the pumped volume, and to the total losses; and
   the pulse duration is proportional to the cavity length, and inversely to the losses.

Consequently, for a given design of the microchip (i.e. for a fixed laser threshold), the pulse duration is approximately constant, while the pulse energy does not vary with pump power if the focusing of the pump is unchanged. Thus, repetition rate is the sole performance parameter that can be controlled through pump power only. To achieve control of the peak power, a more complex design of laser is involved.

Changing the pulse energy requires an adjustment of the pump beam focus by translating the focusing optics to adapt its magnification. However, positioning tolerances for such optics are generally very tight (a few microns) so that the accurate control of the pulse parameters requires a high precision mechanical mounting scheme which is not very practical and considerably expensive.

Another alternative would be to use an output-coupling mirror with a reflection coefficient that varies across the surface of the microchip, so that the cavity losses could be adjusted by translating the microlaser laterally. However, this solution is also not very practical and technically very difficult to implement given the typical lateral dimensions of a microlaser. It would also be very expensive since it would require that every microchip be coated independently, thereby losing the benefit of mass processing, which is a major advantage that the microchip concept has introduced.

For actively Q-switched lasers the situation is obviously completely different, as they possess a larger number degrees of freedom. Many ways of controlling the pulse energy and the repetition rate have been disclosed in prior art, based mainly on the proper control of the Q-switch element. However, passively Q-switched lasers have some key advantages over actively Q-switched lasers, such as size, cost, peak power, etc. which make them unique solutions for some applications.

In conclusion, to the best of our knowledge, no simple means has been disclosed for controlling the output pulse parameters of passively Q-switched lasers.

However, the ability to independently control the pulse energy or the peak power density is a key factor for some applications. Here is a non-exhaustive list of examples:
   in MALDI, the peak power density has to be larger than the ionization threshold; varying the laser spot size on the surface of the sample allows the number of ionized molecules to be changed, so that molecules with different responsivity can be analyzed;
   in time-of-flight ranging, the peak power impacts on the range, while the spot size determines the lateral resolution for scanning systems,
   in machining applications, the spot size determines the resolution, while the peak power impacts on the machining speed.

According to the basic trends detailed above, the laser output parameters of a passively Q-switched microchip laser can be controlled by varying the lengths of gain media and saturable absorber media that are present within the laser cavity.

Prior Art

Many embodiments of actively Q-switched lasers allow the output performance to be readily controlled. However, they have intrinsic disadvantages compared to passively Q-switched lasers in terms of size, complexity, cost, ruggedness.

There are several disclosures of passively Q-switched lasers in prior art, of which the most relevant will be discussed here.

Shinichi (Japanese Patent JP 07-131102,A, Toshiba) discloses a laser cavity configuration in which the optical path length through the gain media remains constant as the optical path length through the saturable absorber is varied by the displacement of a wedge-shaped prism transversely-to the cavity optical axis.

This patent does not disclose a means for changing the length of the gain media in the optical cavity and all figures in the patent show a cavity gain media of constant length.

The only publication that suggests varying the length of the gain medium is Masuda (U.S. patent application Ser. No. 20050078719A1, Sony Corporation).

The patent application discloses a solid-state laser resonator that has an interface inclined from a plane orthogonal to the optical axis of the excitation light. The light path length of the solid-state resonator in the direction parallel to the optical axis of the excitation light differs depending on setting of the position of excitation. That is, the light path length of the resonator can be specified or can be adjusted depending on the setting of the position of excitation in the direction orthogonal to the optical axis of the excitation light.

However, in the disclosed invention the variation of the optical length of the cavity is very limited (less than one wavelength), which is not enough for yielding a broad range of control of the output performance. The cavity is also misaligned, whereby losses are increased and performance reduced.

As a consequence, the main purpose of this patent is to provide a convenient way of controlling the longitudinal modes in the cavity, and then of finding stable operation rather than to vary the pulse parameters.

Sumida (U.S. Pat. No. 5,303,256, Hughes Aircraft Company) emphasizes the use of a non-doped wedge in order to avoid any variation or non-homogeneity of the performance. It does not, however, report (or claim) varying the transmission of the saturable absorber to adjust the laser output performance.

The invention by Fukumoto (U.S. Pat. No. 6,466,593, Raytheon Company) discloses a passive Q-switch having a variable thickness, comprising of a pair of saturable absorber wedges mounted so that they can be translated with respect to each other. A means for varying the thickness of the saturable material that is present in the laser cavity is thereby provided. This mechanism adds complexity, and further increases the likelihood of misalignment when adjusting the output parameters.

Semiconductor saturable absorbers are disclosed by Tan (U.S. Pat. No. 6,842,466, Nanyang Technological University), which have a limited range of achievable performance. According to this invention, a semiconductor passive Q-switch laser with a variable transmittance Q-switch produces variable output suitable for use in a laser system with defined output characteristics.

As the disclosed laser is based on a coating with variable transmittance across the output aperture, the solution is difficult to implement in manufacturing, as coatings have to be applied individually to each laser chip. The use of a wedged shape saturable absorber is not detailed in this patent, no embodiment is described, and the claims are limited to coatings with variable transmittance.

The patent also teaches the use of a semiconductor wedge that can be translated normal to the laser cavity axis.

The five disclosures described above concern non-monolithic laser cavities, which induce several important limitations:
  sensitivity of laser performance to misalignment and vibrations. In particular, drift of performance with temperature or over time is very common in this geometry;
  higher number of optical interfaces inside the cavity tend to increase optical losses;
  oblique interfaces inside the cavity (as described in prior art) also degrade the quality of the output laser beam through the introduction of astigmatism into the laser cavity;
  the longer cavity length implies a longer pulse duration, and thus a lower peak power.

All five embodiments described above deal with controlling the performance of passively Q-switched lasers in extended cavity configurations. From this perspective, all approaches described in these documents add one drawback to those listed above: the translation of the wedged element is an additional source of misalignment of the cavity, introducing additional optical losses.

All the cited prior art considers only variation of the optical path length within the saturable absorber, but not in the gain medium. This reduces the accessible range of variation of the performance, and puts heavier constraints on the design parameters (e.g. the angle of the wedge needs to be twice larger).

For these reasons, monolithic laser cavities (so-called microchip lasers) are a preferred solution to overcome all the above-cited issues.

For instance, the passively Q-switched microchip lasers described by Zaykowski (U.S. Pat. No. 5,394,413) permits the construction of lasers with smaller size, no external control for pulse formation, high peak power, very low sensitivity to misalignment or vibration. Although this patent teaches that output performance is related to the design of the microchip, it gives no method of modifying it in a controllable manner.

Another example is Peterson (U.S. Pat. No. 6,668,004), who discloses a passively Q-switched microlaser based on an arrangement of wedged or triangular shaped microchips. The purpose of the invention claimed in that patent is to increase the length of the microlaser while preserving the most compact design. No reference is made to controlling or varying the output performance of the laser. As the optical path in the microlaser is fixed, no variation of the relative position of the pump beam within the microlaser is considered.

One common drawback of passive Q-switching is the difficulty to control the output laser performances (repetition rate, pulse duration, pulse energy) because of the absence of external control of the Q-switch. As a consequence, in the prior art, there is currently no means to control and vary the output performance of microchip (monolithic) lasers.

No prior art was found which discloses the embodiments for the passive Q-switch microchip laser that suppress spatial hole burning.

Variable-focus lenses or optics are widely described in prior art. To the best of our knowledge, the combination of such optics with a passively Q-switched laser has never been disclosed.

It is an object of this invention to provide simple solutions to achieve such control of the output performances of passively Q-switched microlasers, while preserving the intrinsic advantages of the microchip laser configuration.

It is a further object of the invention to provide a monolithic geometry and a fixed pump geometry with only a few available degrees of freedom for easy and stable control of the output performance with respect to pump power and temperature of the microlaser.

It is another object of the invention to combine variable-focus lenses or optics with a passively Q-switched laser to achieve additional control over operating regimes.

SUMMARY OF THE INVENTION

A simplified design is disclosed for varying the optical path lengths of the lasing (gain) and saturable absorber media within the cavity of a passively Q-switched microchip laser. By varying the optical path lengths by way of a transverse translation of the microchip, control of the output pulse energy, pulse duration, peak power and peak power density is enabled in a simple and inexpensive way.

The basic configuration according to this disclosure is a laser cavity comprising of a gain medium block and a saturable absorber block that are optically contacted together to form a single parallel-faced block in which the optical contacting plane is tilted with respect to the laser cavity optic axis. Translation of the rectangular block normal to the laser cavity axis varies the optical path lengths in the gain media and saturable absorber media that are present in the laser cavity thereby providing a simple means for varying the laser output characteristics. Several different designs for the block are disclosed.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

Exemplary embodiments of the invention will now be described in conjunction with the drawings.

DETAILED DESCRIPTION OF PREFERRED EMBODIMENTS

The present invention provides for an easy way to control the pulse energy, pulse duration or peak power density of passively Q-switched microlasers by designing the geometry of the laser cavity (e.g. wedged-shaped materials) so that the optical path in the active medium and/or the saturable absorber can be varied by simple displacement of the microlaser. Such structures can be produced using standard techniques: diffusion bonding (or optical contacting) of wedged plates, or liquid phase epitaxy of one material on a wedged substrate of the other material. In addition, combining such a microlaser with variable-focus optics allows the peak power density of the output laser beam to be controlled.

Such a laser system can be used for direct application, or seed a subsequent amplifier or harmonic generation stages.

Figure 1:
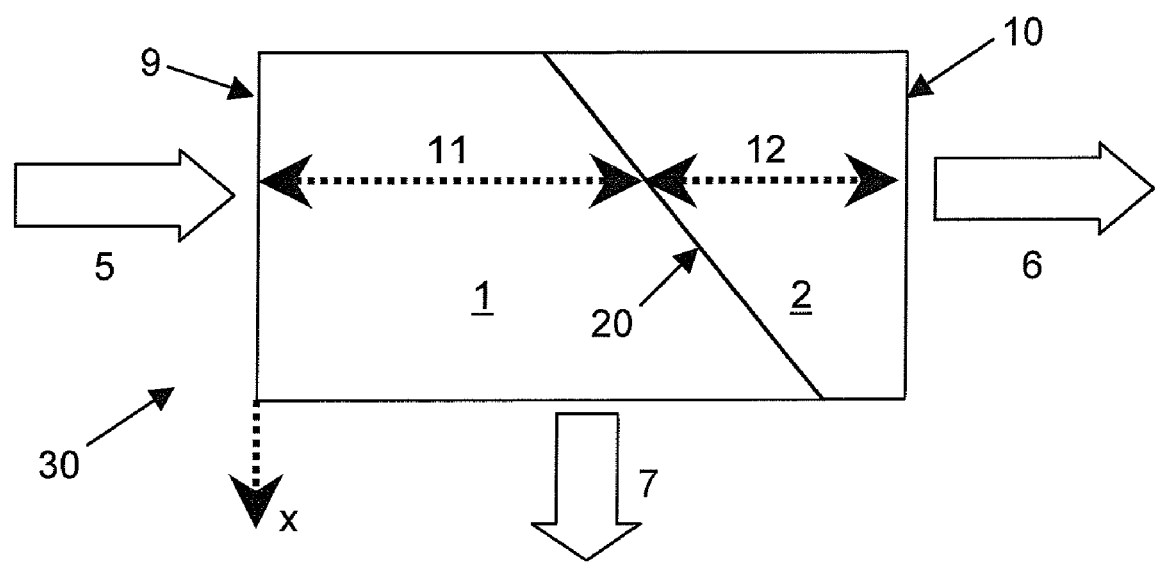
FIG. 1 is a side view of a passively Q-switched microchip laser with wedge-shaped gain and saturable absorber regions.

A first exemplary embodiment is described in FIG. 1, in which a microchip 30 comprises a wedge-shaped gain medium 1, and a wedge-shaped saturable absorber medium 2, bonded at an interface 20. A lasing cavity is defined between an input mirror surface 9 and an output coupler surface 10. The surface of the input mirror 9 on the gain medium 1 is coated for high reflectivity at a lasing wavelength, but high transmittivity at a pump wavelength, while that of the output coupler 10 on the saturable absorber medium 2 is coated with a film, which is partially reflecting at the lasing wavelength. A pump beam 5 is directed onto the microchip 30, which causes a lasing beam to oscillate along an optical path between the input mirror 9 and the output coupler 10, from which a laser output beam 6 is emitted.

The interface 20 makes an acute wedge angle with respect to the lasing beam, which traverses an optical path length 11 within the gain medium 1 and an optical path length 12 within the saturable absorber medium 2. The magnitude of the acute wedge angle is chosen to provide the desired control sensitivity of the optical path lengths 11 and 12 as the microchip 30 is translated transversely relative to the pump beam 5 along a direction, which is approximately parallel to the input mirror 9 and to the 'x' axis.

Looking in the direction of the input pump beam, both gain medium 1, and saturable absorber medium 2, have two faces—an input face and an output face. So, in the above, "wedged shaped" refers to the shape of a cross-section of the medium in a plane perpendicular to both the input and output faces. For the general case including designs with non-planar faces, the wedge angle is defined as the angle between the input and output faces at the point where they are intersected by the lasing beam. When the wedge angle is an acute angle, e.g. non-zero, any lateral translation of the lasing beam with respect to the lasing cavity will produce a corresponding change in the length of the optical path of the lasing beam within the medium bounded by those input and output faces. In practice, a wedge angle greater than about 1.4° is preferred in order to achieve appreciable optical path length changes. However, the changes in optical path length can be as much as 500% or more.

An optical path or an axis is considered 'normal' to a plane if it is perpendicular to that plane, in other words intersects it at 90°.

The translation is typically effected by a mechanical translation stage 7 aligned parallel to the 'x' axis, which can be actuated in either direction by a hand-operated worm gear mechanism or by a suitable electrical motor drive or other type of actuator.

Denoting the optical path length within the gain medium, 11, by $l_{gain}(x)$, and its counterpart within the saturable absorber, 12, by $l_{SA}(x)$, the cavity length $l_{cav}$ is given by:

$$l_{cav}=l_{gain}(x)+l_{SA}(x)$$

In this design, translation of the microchip 30 along direction x, keeping pump power and all other parameters constant, leads to:

- decrease of the losses at the laser wavelength, as the length of the saturable absorber decreases with x;
- increase of absorbed pump power, as the length of the gain medium $l_{gain}(x)$ increases with x; and
- a constant cavity length.

According to the basic trends detailed above, the output performance parameters vary as follows: pulse energy E decreases, pulse period τ increases and pulse repetition rate, f, increases.

In a more detailed analysis, other effects will also impact on the output laser performance. Because of higher absorbed pump power, thermal lensing will increase, thus generally reducing the pumped volume and the pulse energy. The divergence of the laser beam may also change slightly.

Variation of the absorbed pump power also impacts on microchip temperature. As a consequence, the wavelength of the longitudinal modes shift relatively to the gain curve, and the laser performance changes. A more advanced embodiment of particular interest would then include an additional means for controlling the temperature of the microlaser (e.g. thermoelectric cooler).

Higher absorption of the pump power also leads to lower pre-bleaching of the saturable absorber by unabsorbed pump light. This will increase the amount of useful losses, thus tending to slightly increase the pulse energy.

Spatial hole-burning is also favored when the saturable absorber is short and close to the cavity ends. As a consequence, translating the microlaser will affect the ability of additional longitudinal modes to oscillate, thereby impacting on the stability of the laser.

Finally, translating the microlaser will lead to a continuous variation of the output pulse parameters, the amplitude of the variation depending on the combination of the different effects listed above.

Even though FIG. 1 shows a simple wedge geometry, it is obvious to those skilled in the art that more complicated geometries will lead to similar effects. The bonding interface 20 between the saturable absorber 2 and the gain medium 1 can be cylindrical, spherical, or have an arbitrary shape, without departing from the spirit of this invention.

Figure 2:
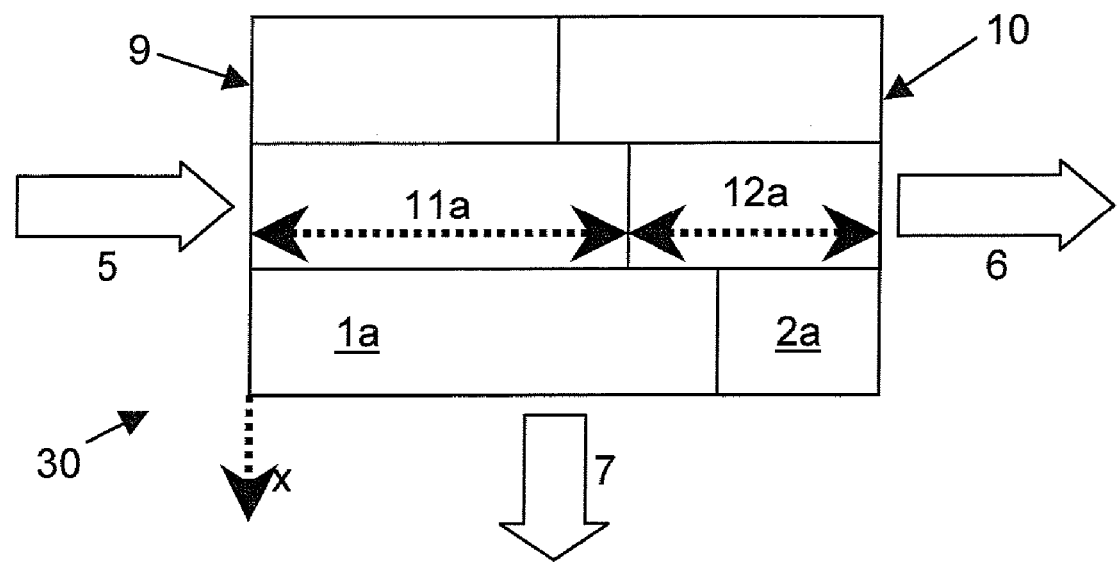
FIG. 2 is a side-view of a passively Q-switched microchip laser with discrete variations of the lengths of the active medium and the saturable absorber.

In the same way, the variation of the lengths of the gain medium 1 and of the saturable absorber 2 can be realized in discrete steps rather than continuously, as shown on the geometry of FIG. 2. The microchip 30 comprises two or more slabs bonded together perpendicular to the input mirror 9 and extending to the output coupler 10. Each slab has a different length of gain medium 1a and saturable absorber 2a. An alternative embodiment can use discrete microchip slabs with similar media but different output couplers reflectivities, with the drawbacks of increased fabrication cost and complexity.

In the case of a plane interface, FIG. 1 shows the simplest displacement of the laser microchip, i.e. in a plane perpendicular to the saturable absorber/gain medium interface 20 and the input mirror 9. Nevertheless, the displacement can also be implemented in a different plane without departing from the scope of the present invention, since it will lead to exactly similar effects, as long as it has a projection along the x-axis. In an equivalent way, the pump beam can be moved relatively to the microchip (e.g. by a movable lens or mirror).

Different embodiments of the invention can be derived from the microchip arrangement of FIG. 1 by changing the pump mode. The above description considers a constant continuous wave pump power. A second exemplary embodiment can use a continuous wave pump beam 5, where the pump power is adjusted simultaneously to the translating of the microchip 30. This will, for example, permit the absorbed pump power to be kept constant in order to have a constant pulse repetition rate.

In a third exemplary embodiment, the pump beam 5 can be operated in a modulated mode, so that the repetition rate of the laser is set by the modulation frequency of the pump. In this case, the time for build-up of the laser pulse will vary as the microchip 30 is translated. The duration of the pump pulses will then advantageously be chosen to be equal to that build-up time, in order to avoid emission of multiple laser pulses in one pump pulse cycle. This can be achieved, for example, by detecting the emission of the laser pulse and applying a feedback to the drive current of the pump. This mode of operation is particularly interesting in the context of instant invention, because the variation of the pulse energy and pulse duration can thus be decoupled from the selection of the repetition rate.

In yet another exemplary embodiment, the pump beam 5 can be modulated, and its amplitude varied simultaneously to translating the microlaser in order to control some of the laser performance parameters.

Figure 3A:
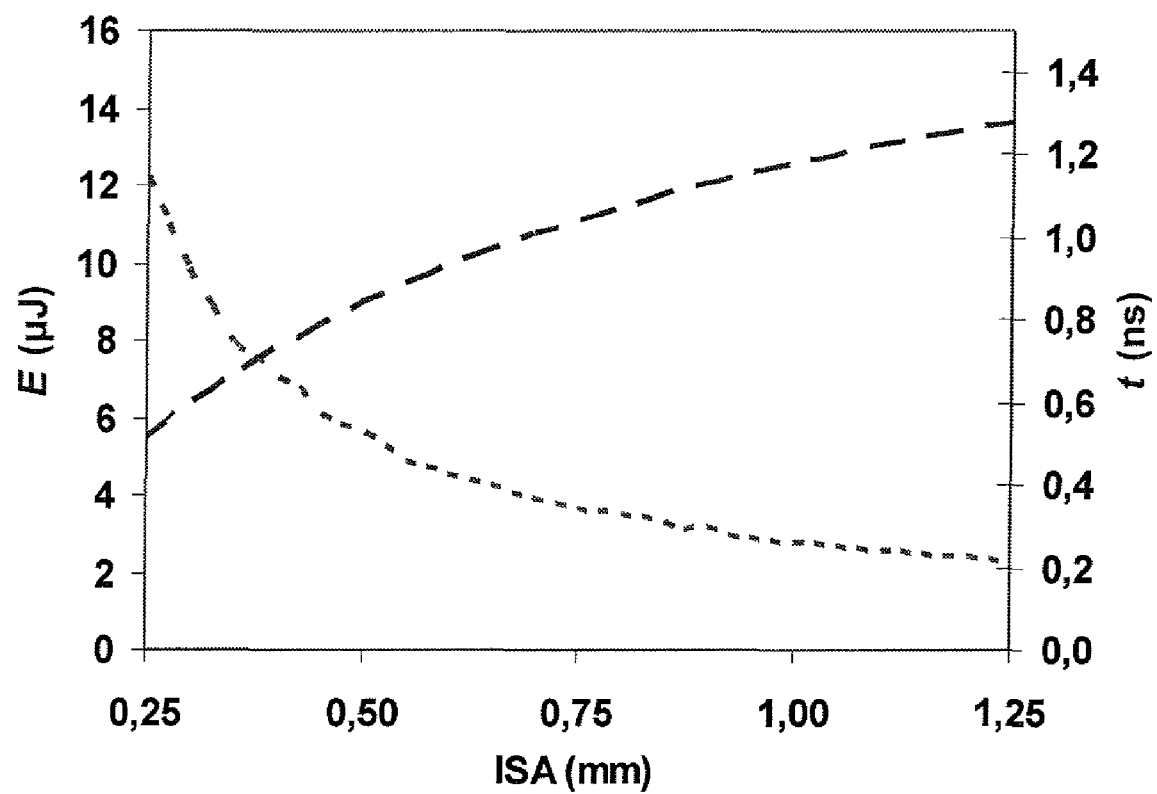
FIG. 3a is a graph of the calculated variations of the pulse energy (dashed line), of the pulse duration (dotted line) and of the repetition rate (solid line) versus length of the saturable absorber, C.W. pump beam.
Figure 3B:
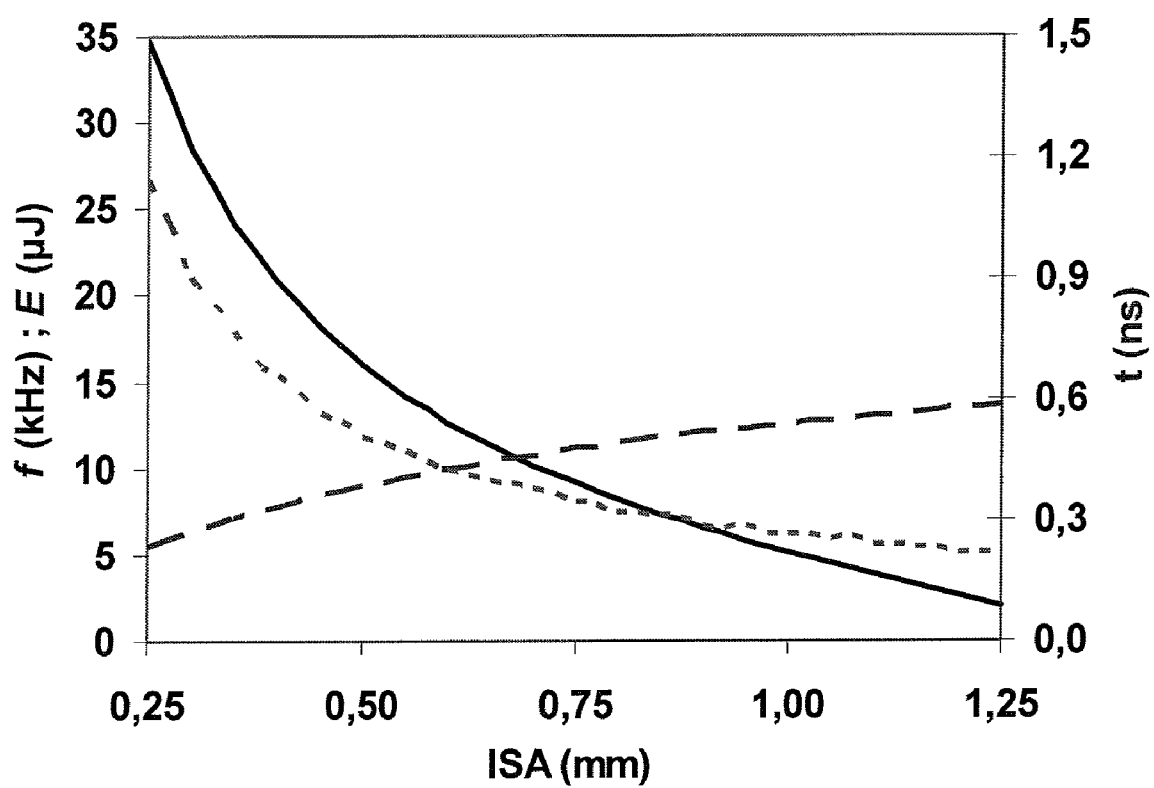
FIG. 3b is a graph of the calculated variations of the pulse energy (dashed line), of the pulse duration (dotted line) versus length of the saturable absorber, modulated pump, repetition rate fixed at 1 kHz.

A more detailed analysis of the variation of the output performance with displacement of the microchip 30 is presented on FIGS. 3a and 3b, which has been obtained from computer simulations based on the complete set of laser equations, including all effects mentioned above.

These calculations consider a microchip with a design as shown on FIG. 1. The gain medium is Nd:YAG, with 1.3% $Nd^{3+}$ concentration. The saturable absorber is $Cr^{4+}$:YAG, with an unsaturated absorption of 6 $cm^{-1}$. The total length of the microchip 30 is 2 mm. For a wedge angle of 45°, the variation of $l_{SA}(x)$ considered in FIG. 3a corresponds to a lateral displacement x of 1 mm. The reflectivity of the output coupler is 85% at 1064 nm. The pump beam at 808 nm is focused with an average radius of 70 μm. Absorption of the pump was chosen at 7 $cm^{-1}$. The radius of the laser mode in the cavity was fixed at 60 μm.

FIG. 3a corresponds to a continuous wave pump beam, with a constant power of 1.3 W. As the optical path length $l_{SA}$, 12, within the saturable absorber is varied from 0.25 mm to 1.25 mm (corresponding to an increase by 500%), the pulse energy increases from about 5.5 μJ to 13 μJ, while the pulse duration is decreased from 1.15 ns to 0.2 ns. These results confirm the basic trends stated above: an increase in 'x' leads to an increase of pulse energy, and simultaneous decrease of the pulse duration and repetition rate. This complete calculation also shows that a wide range of the output performance can be achieved with reasonable design parameters.

FIG. 3b corresponds to a modulated pump with a repetition rate of 1 kHz and a peak power of 1.3 W. As the optical path length $l_{SA}$, 12, within the saturable absorber is varied by 500% from 0.25 mm to 1.25 mm, the pulse repetition rate is reduced from 35 kHz to 2 kHz, pulse energy increases from about 6 μJ to 13 μJ, while the pulse duration is decreased from more than 1.1 ns to about 0.2 ns. The duration of the pump pulses is equal to the emission delay of one laser pulse (varies with $l_{SA}$). Operation with modulated pump can be achieved at higher repetition rates with the same microlaser, by either using a higher pump peak power, or by applying a constant offset pump power (as described for example in Fève et al, Advanced Solid State Photonics 2005, paper TuB39). Using a modulated pump allows the repetition rate of the laser to be controlled independently. Moreover the magnitude of the variations of the pulse energy and pulse duration is very similar to the previous case. This solution is particularly interesting from an application point of view.

These results were obtained using multiple microchips, with different lengths of the materials, rather than one single wedged microlaser. They use Nd:YAG as an active medium, with 1.3% $Nd^{3+}$ concentration. The saturable absorber is $Cr^{4+}$:YAG, with an unsaturated absorption of $6 cm^{-1}$. Pumping is achieved with a 2 W diode at 808 nm. These results confirm all trends given above. They also confirm that important variations of the output performance can be achieved with practical design dimensions.

Figure 4A:
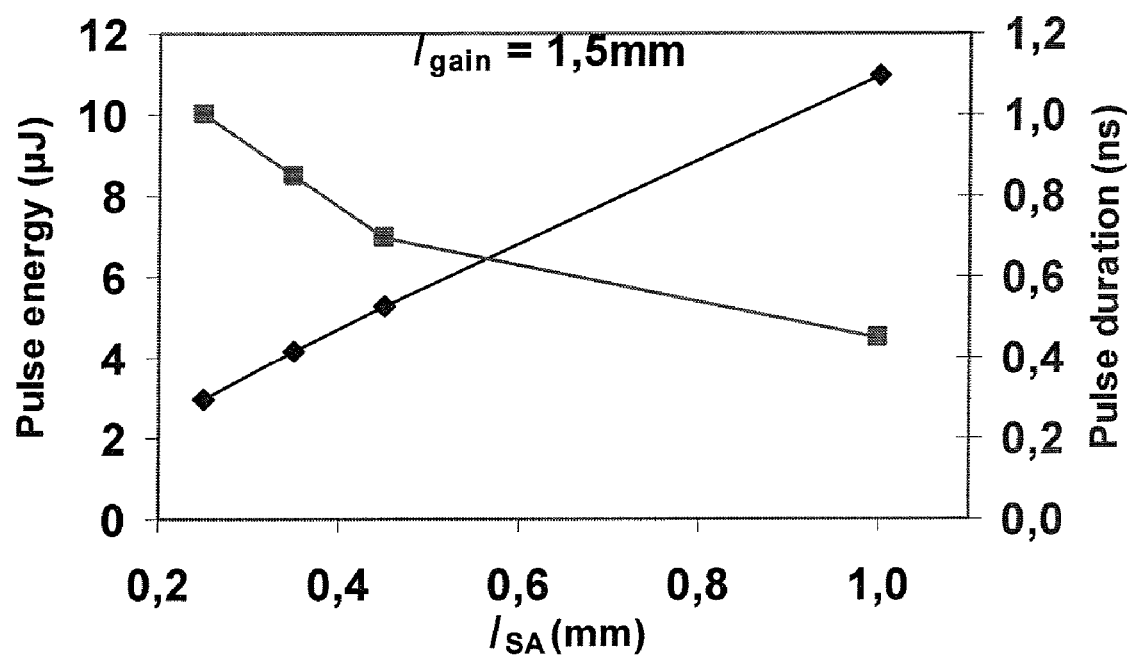
FIG. 4a is a graph of the measured variations of pulse energy and pulse duration versus the length of the saturable absorber.
Figure 4B:
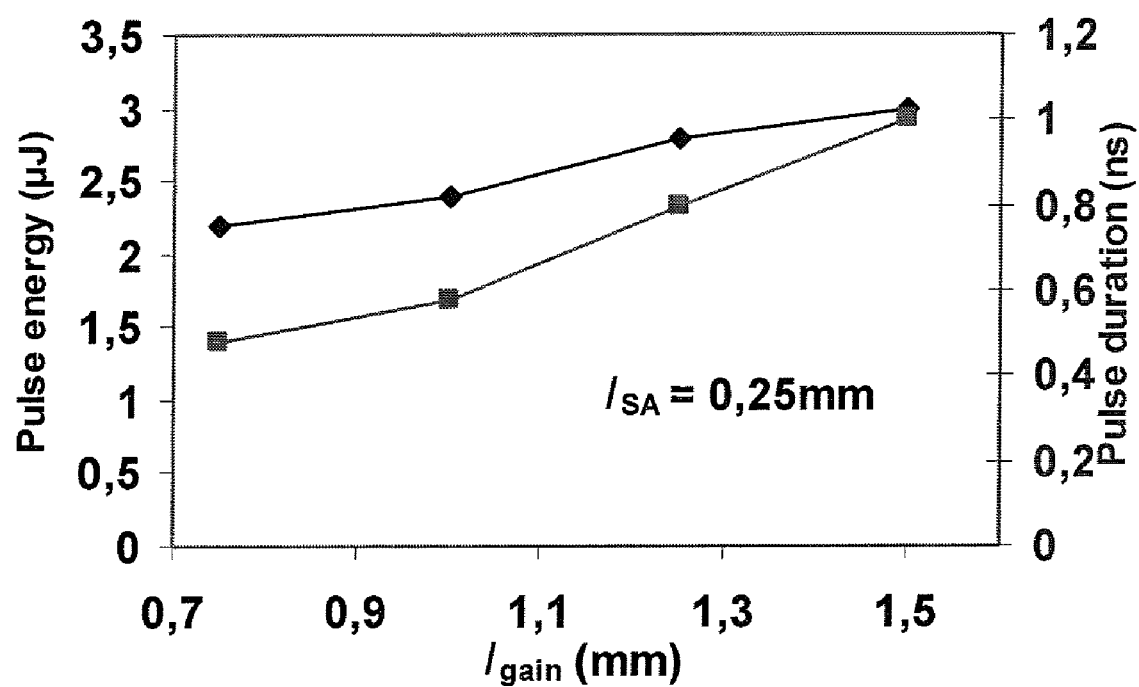
FIG. 4b is a graph of the measured variations of pulse energy and pulse duration versus the length of the gain medium.

An example of the measured variation of performance that can be achieved is shown in FIGS. 4a and 4b. These results were obtained using multiple microchips, with different lengths of the materials, rather than one single wedged microlaser. They use Nd:YAG as an active medium, with 1.3% Nd.sup.3+concentration. The saturable absorber is Cr.sup.4+:YAG, with an unsaturated absorption of 6 cm.sup.−1. Pumping is achieved with a 2 W diode at 808 nm. These results confirm all trends given above. They also confirm that important variations of the output performance can be achieved with practical design dimensions.

Other geometries of the microlaser can be used to produce similar effects. They mostly lie in three groups:

1) the optical path length in both the active medium and the saturable absorber is varied (as in FIG. 1);
2) the optical path length in the active medium is kept constant while that in the saturable absorber is varied;
3) the optical path length in the saturable absorber is held constant length while that in the active medium is varied.

In all cases, the overall microchip forms a plane-parallel cavity to allow resonance whatever the displacement of the microchip with respect to the pump beam. Allowance for a minor departure from parallelism of the output coupler 10 with respect to the input mirror 9 may be required in cases where deviations of the laser beam from a straight line caused refractive index differences between the various media cannot be neglected.

Figure 5A:
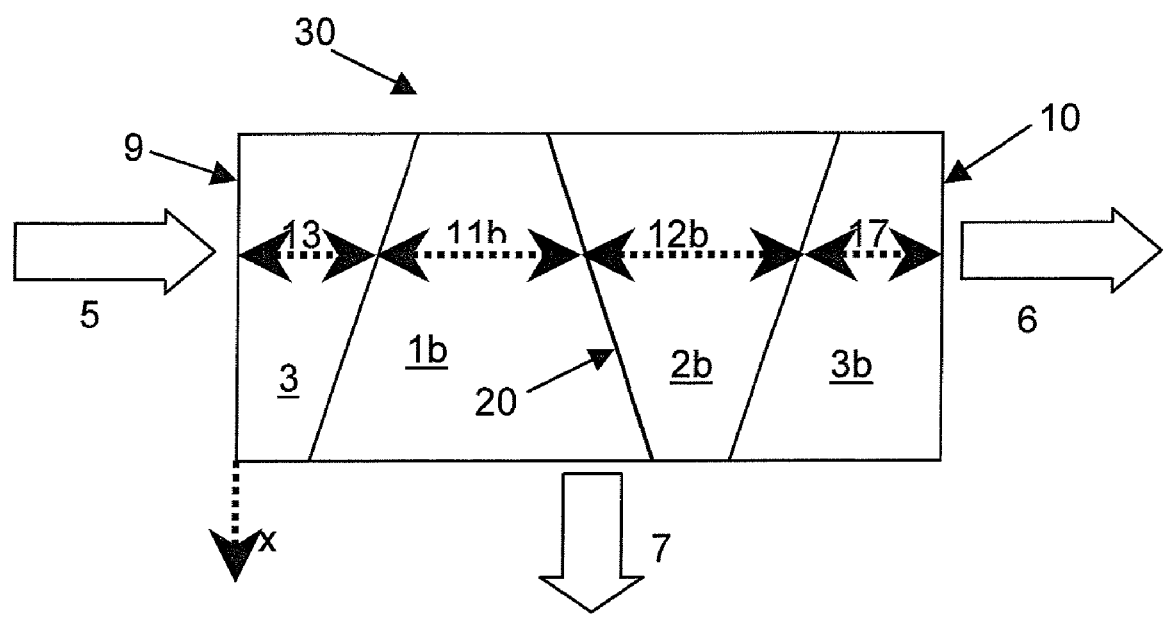
FIG. 5a is a side-view of a second geometry of a passively Q-switched microchip laser with wedge-shaped gain and saturable absorber regions and end caps made of undoped material.
Figure 5B:
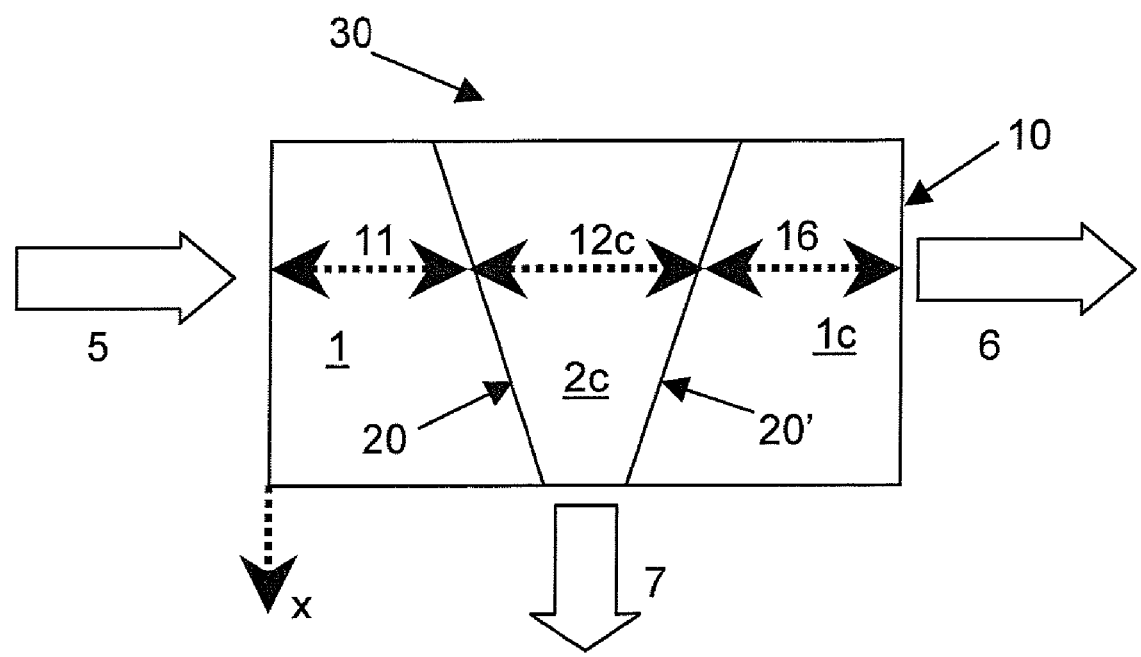
FIG. 5b is a side-view of a second geometry of a passively Q-switched microchip laser with symmetric wedge-shaped gain and saturable absorber regions but without end caps.

A further example is shown in FIG. 5a, which is an extension of the first exemplary embodiment shown in FIG. 1. In this embodiment, however, both the wedged gain medium 1b and wedged saturable absorber 2b are sandwiched between two end-caps 3, 3b comprising undoped transparent medium with corresponding optical path lengths 13 and 17 respectively. Translation of the microchip 30 in the 'x' direction by the translation stage 7 results in similar effects to those described for the first exemplary embodiment. An equivalent design is shown in FIG. 5b, where the gain medium is split in two half-wedges 1 and 1c with corresponding optical path lengths 11 and 16 respectively in order to reduce the number of optical parts and bonded interfaces. The saturable gain medium 2c is thus fully enclosed within the microchip 30 between interfaces 20 and 20', while the input mirror 9 and the output coupler 10 are formed on the gain medium 1 and 1c respectively. In cases such as this, it may be advantageous to provide pumping from both ends of the microchip 30 through input mirror 9 and the output coupler 10 with corresponding adjustments in their reflective coatings. Specific advantages of these configurations are:

1) given a wedge apex angle, the larger number of angled interfaces increase the variations $\partial l_{SA}/\partial x$ and $\partial l_{gain}/\partial x$ for a given lateral displacement compared to the case in FIG. 1. This allows either the width of the microchip or the wedge angle to be reduced in order to generate the same variation of the laser performance;
2) placing the saturable absorber at the center of the cavity is highly favorable for suppressing the consequences of spatial hole burning: this geometry will reduce longitudinal multimode operation resulting in increased stability of the laser;
3) due to the symmetry of the gain medium in the cavity, optimum focusing of the pump beam can be preserved for every lateral position of the microlaser.

Figure 6:
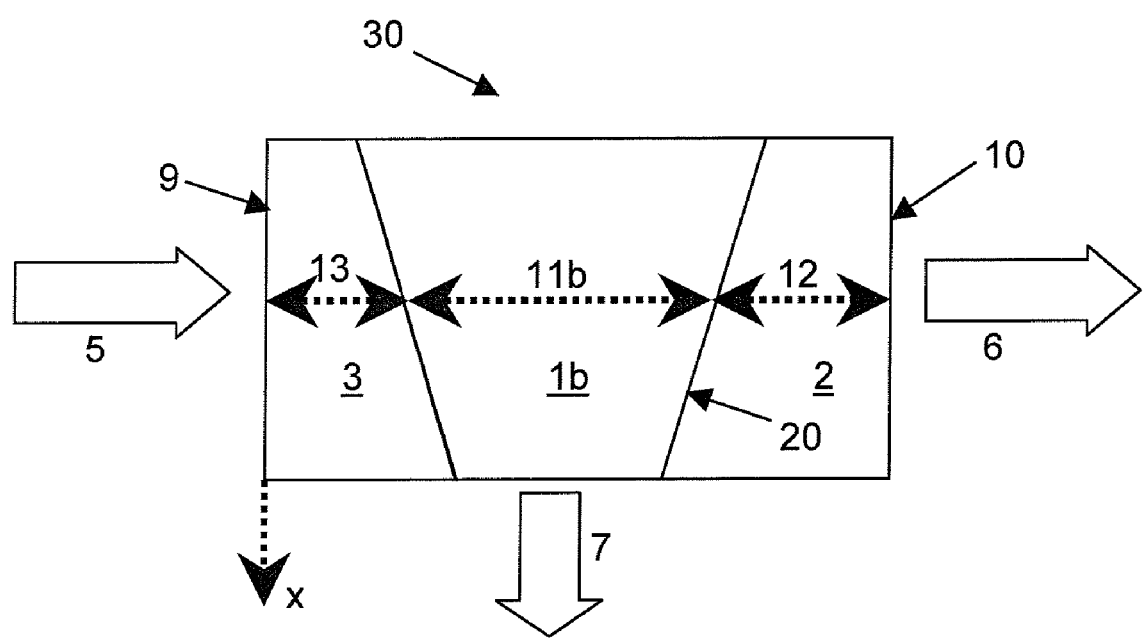
FIG. 6 is a side-view of a third geometry of a passively Q-switched microchip laser with wedge-shaped gain and saturable absorber regions and an input cap made of undoped material, or alternatively, of saturable absorber.

FIG. 6 shows the geometry of yet another exemplary embodiment that allows similar control of the laser performance. The wedge-shaped gain medium 1b is symmetrical about a plane parallel to the input mirror 9 and enclosed between an end-cap 3 comprising undoped transparent medium and saturable absorbing medium 2. As the microchip 30 is now translated along a direction parallel to 'x', the optical path lengths 11b and 12 vary in different proportions, in contrast to the first exemplary embodiment, where these proportions are practically equal. The slopes $\partial l_{SA}/\partial x$ and $\partial l_{gain}/\partial x$ are also larger compared to the geometry of the first exemplary embodiment. In this embodiment, the physical length of the cavity does not change, while the optical length will depend on the refractive index of the undoped cap compared to the two other materials. If they are equal, $l_{cav}$ is unchanged. This gives an additional degree of freedom for altering the variation of the optical length of the laser, and thus the pulse duration independent of the pulse energy.

Figure 7:
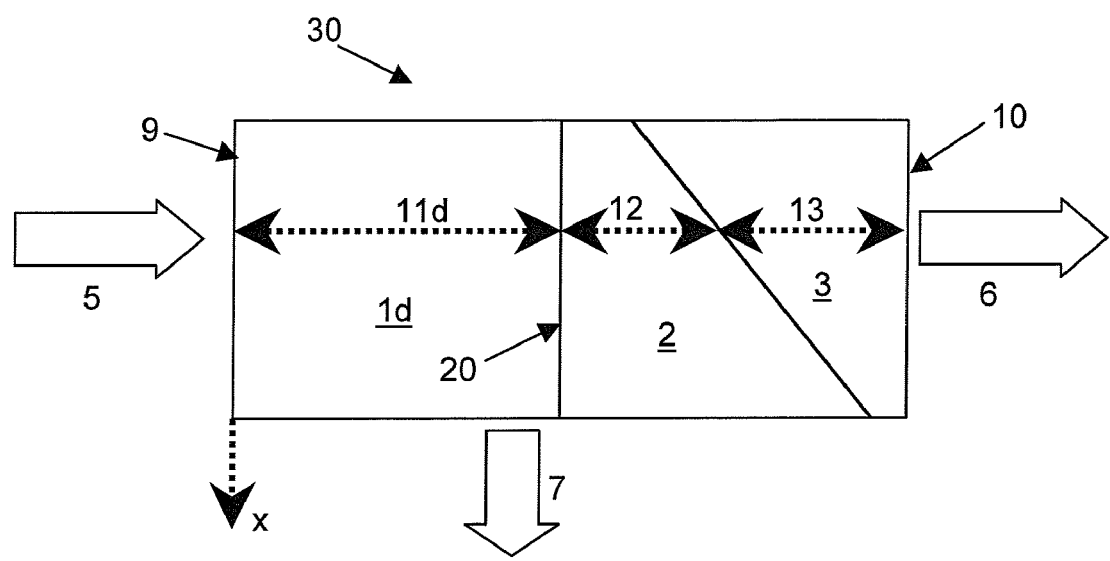
FIG. 7 is a side-view of a fourth geometry of a passively Q-switched microchip laser with flat gain region, wedge-shaped saturable absorber region and a bonded output cap made of undoped material on the external side of which the output coupling mirror is deposited.

FIG. 7 shows a further example embodiment where the interface between the gain medium 1d and the saturable absorbing medium 2 is parallel to the input mirror 9. Thus the optical path length 11d within the gain medium 1d stays constant, while only the optical path length 12 within the saturable absorbing medium 2, $l_{SA}$, varies under lateral translation of the microchip 30. This has the advantage that for a constant pump power the absorbed pump power is independent of the lateral translation, so that thermal effects are constant. This geometry permits the optimum focusing of the pump beam to be maintained independently of the position 'x' of the microchip 30. Pre-bleaching of the saturable absorber by unabsorbed pump also stays unchanged. According to the basic trends defined above, as the microlaser is translated in the 'x' direction, the repetition rate will decrease, since losses increase, thus increasing the laser threshold while absorbed pump power stays constant. The pump power can also be varied while translating the microchip 30 in order to maintain a constant repetition rate. In both cases, the pulse energy will increase while the pulse duration will be lowered when moving along 'x'. This embodiment can also use a modulated pump. There is no need to simultaneously vary the pump power while translating the microlaser, but this may also be done.

Figure 8:
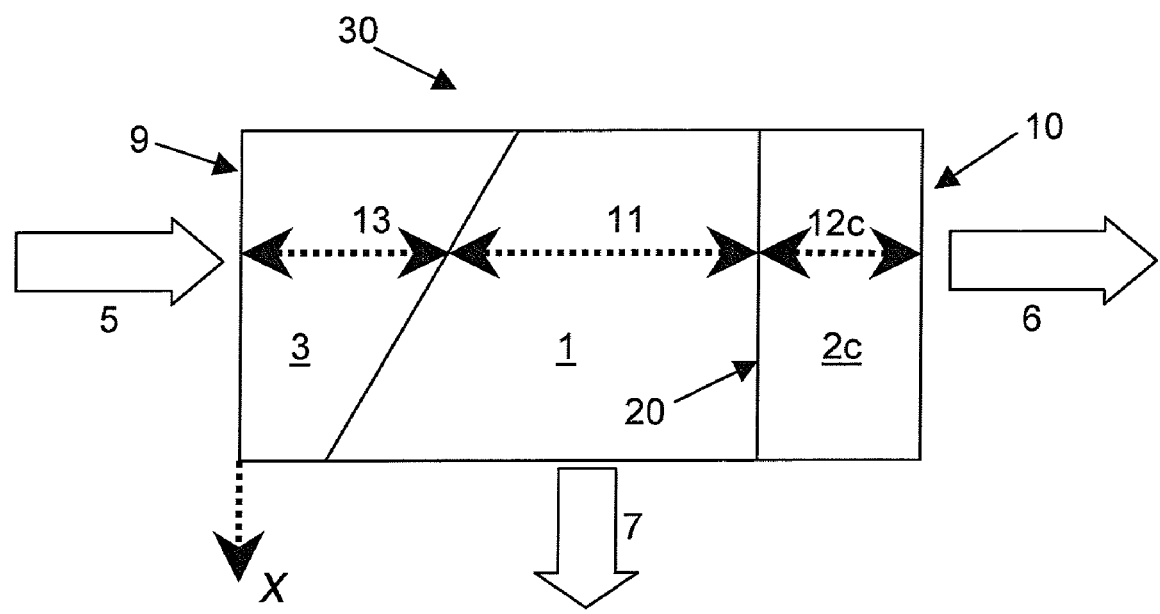
FIG. 8 is a side-view of a fifth geometry of a passively Q-switched microchip laser with wedge-shaped gain region, flat saturable absorber region and an input cap made of undoped material.

Another embodiment is shown in the example of FIG. 8 where under translation of the microchip 30 along the 'x' direction the optical path length 12c in the saturable absorber 2c does not change while only the optical path length 11 within the gain medium 1, $l_{gain}(x)$, varies. If the pump power is kept constant, the absorbed pump power increases with 'x'. If in addition the optical path length 12c in the saturable absorber 2c is constant, the losses are changed only through pre-bleaching. According to the basic trends defined above, the pulse energy and the pulse duration will exhibit very little variation, while the repetition rate will increase with 'x'.

In a related embodiment of interest using this geometry, the input cap refractive index is larger than that of the gain medium. In this example, the optical length of the cavity will decrease when the optical path length in the gain medium increases, which will reduce the pulse duration. By means of a modulated pump with this embodiment the repetition rate can be kept constant, so that the pulse duration can be varied independently of the other output parameters. This can also be achieved with simultaneous variation of the pump power when translating the microchip 30.

Figure 9:
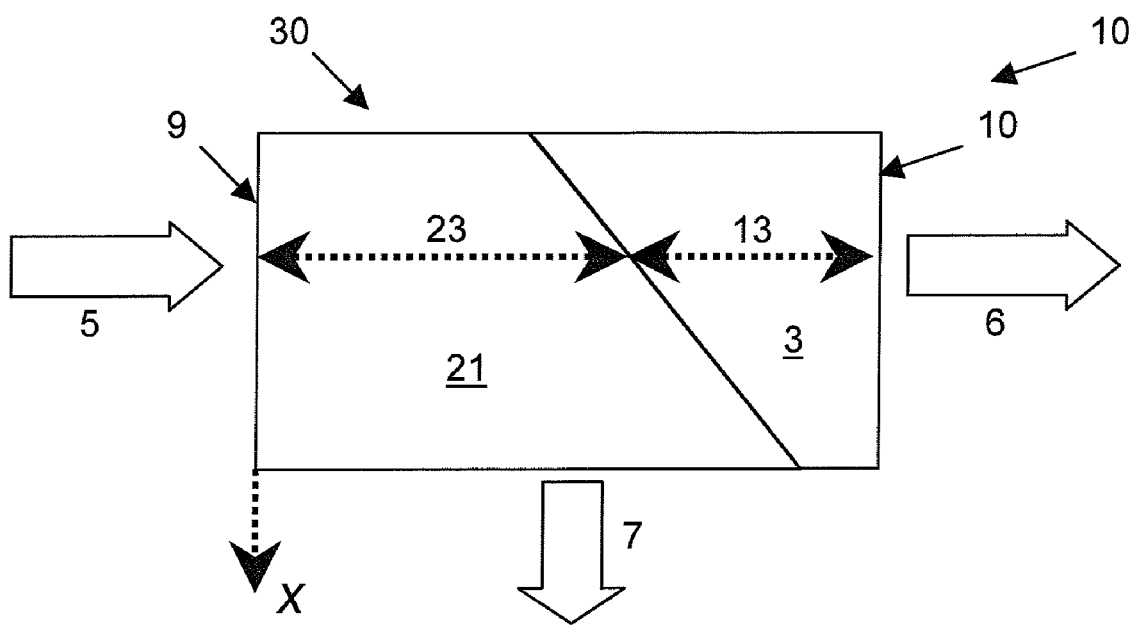
FIG. 9 is a side-view of a passively Q-switched microchip laser with a wedged-shaped medium which is both gain medium and saturable absorber medium.

As a further exemplary embodiment, FIG. 9 presents a structure of the microchip 30 where the same material 21 provides both optical gain and saturable absorption. Such a material could comprise, for example, YAG co-doped with Nd and Cr. An undoped end cap 3 is included to maintain an approximately constant cavity length (the sum of optical path lengths 23 and 13). As the microchip 30 gets translated by the translation stage 7 in the direction 'x', the optical path length 23 of both the gain and the saturable absorber regions is increased, causing both the gain as well as the optical losses to increase.

Figure 10:
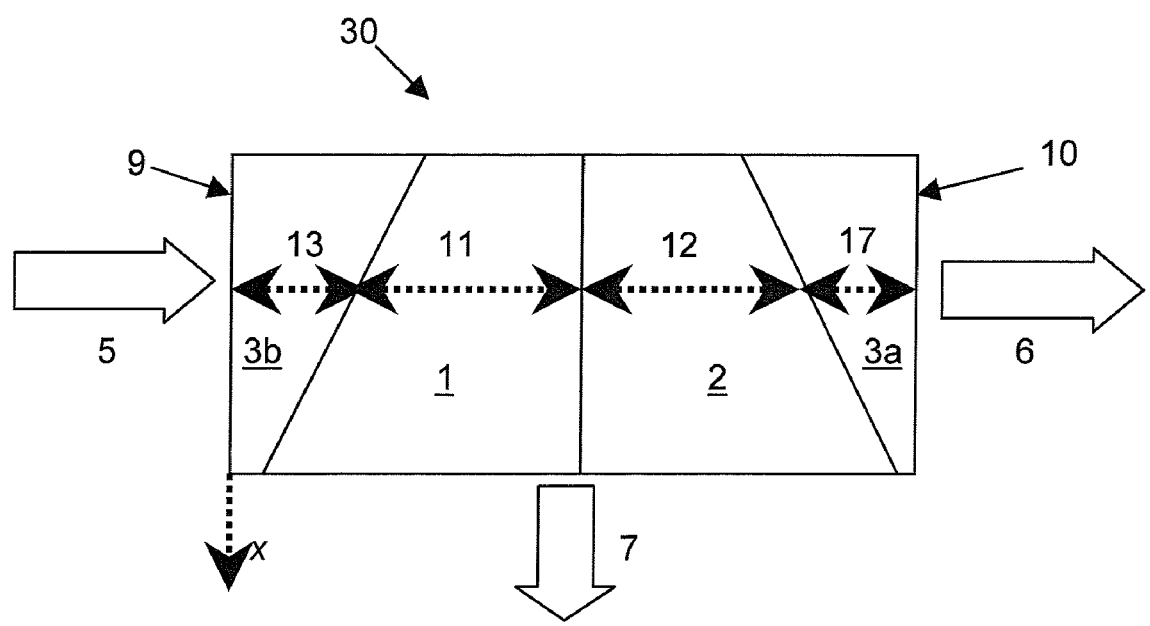
FIG. 10 is a side-view of the equivalent geometry of FIG. 9.

An equivalent geometry of this embodiment example is shown in FIG. 10. To facilitate analysis, the combined material 21 in FIG. 9 has been conceptually divided in separate regions: gain medium 1 and saturable absorber 2 in FIG. 10. The end-cap 3 is correspondingly divided into two parts 3a and 3b.

In this case, translating the microchip along 'x' simultaneously leads to increased absorbed pump power and increased losses. To a first approximation, if the pump power is kept constant, as 'x' is increased, the pulse energy increases, the pulse duration decreases, while the repetition rate has very little variation.

Figure 11:
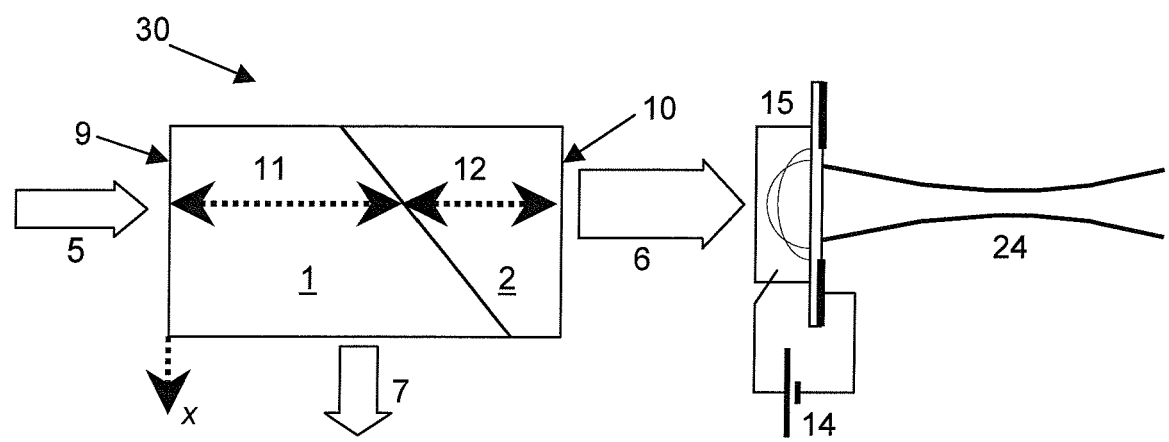
FIG. 11 . depicts a system for generating a laser beam with controllable peak power density using a wedged-shaped laser microchip, and a lens with variable focus.

A system for generating a laser beam with controllable peak power density, based on a wedged laser microchip and a variable focus lens, is disclosed on FIG. 11. In this example, the microchip 30 illustrated in FIG. 1 is supplemented with a lens 15 whose focal length is controlled by voltage 14. The microchip output beam 6 passes through the lens 15, which emits a refocused beam 24. The control of the peak power density of the laser beam is thus facilitated in a simple, compact and inexpensive system. As discussed in the introduction, this feature is of interest for different applications. Combining the different embodiments described above (geometries of the wedged microlaser and pump regimes) with variable-focus optics allows independent control of different output performance parameters of the system. As an example, in a machining or ionization application, the spot size of the laser beam can be changed in order to change the area of treated material, while keeping a constant peak power in order to preserve the efficiency of the interaction.

The invention claimed is:

1. A passively Q-switched microlaser comprising:
   a) a monolithic resonant cavity formed between a first mirror and a second mirror between which, in operation, an optical path where lasing occurs is defined;
   b) a gain medium disposed in the optical path within the monolithic resonant cavity for producing optical gain;
   c) a saturable absorber medium disposed in the optical path within the monolithic resonant cavity, optically coupled and in physical contact with the gain medium, wherein the physical contact traverses the optical path; and
   d) an input port at the first mirror for receiving pump light having a pump wavelength, for energizing said gain medium so as to produce a laser beam at a lasing wavelength, wherein in operation, the beam oscillates along the optical path between the first and second mirrors;
   e) reciprocating means for linearly displacing the input port with respect to the monolithic resonant cavity in a transverse direction perpendicular to the optical path, so as to cause a corresponding transverse displacement of the laser beam with respect to the monolithic resonant cavity;
   wherein at least one of the gain medium or the saturable absorber medium is wedge-shaped or includes discrete steps, whereby the transverse displacement of the input port relative to the monolithic resonant cavity by the reciprocating means causes a variation of:
      i) the distance traversed by the laser beam through the gain medium; or
      ii) the distance traversed by the laser beam through the saturable absorber medium;
   wherein an optical path length of the laser beam between the first and the second minors substantially does not change upon the transverse displacement of the laser beam across the wedge-shaped gain medium or the wedge-shaped saturable absorber medium, or across a single step of the stepped gain medium or the stepped saturable absorber medium.

2. The microlaser in claim 1, wherein the shape of at least one of the gain medium or the saturable absorber medium is such that in operation, the transverse displacement of the laser beam with respect to the monolithic resonant cavity results in a controlled change of at least one of pulse length and pulse energy.

3. The microlaser in claim 1, further including a variable-focus optical element for controlling the peak power density of emitted laser pulses.

4. The microlaser in claim 1, further comprising an end-cap of undoped optically transparent medium disposed in the optical path for adjusting a total length of the monolithic resonant cavity and for maintaining the first mirror parallel to the second minor.

5. The microlaser in claim 1, wherein the saturable absorber medium is disposed in a position away from the first and the second mirrors, such that effects of spatial hole burning are reduced.

6. The microlaser in claim 1, wherein the first minor is highly transmissive at the pump wavelength and highly reflective at the lasing wavelength.

7. The microlaser in claim 1, wherein the second mirror is partially transmissive at the lasing wavelength.

8. The microlaser in claim 1, wherein the saturable absorber medium has a first and a second surface, both of which are intersected by the laser beam.

9. The microlaser in claim 8, wherein one of the first and second saturable absorber medium surfaces is off normal to the laser beam by an angle of between 1.4 and 45 degrees.

10. The microlaser in claim 8, wherein both of the saturable absorber medium surfaces are not normal to the laser beam.

11. The microlaser in claim 8, wherein one of the surfaces of the saturable absorber medium is one of planar, cylindrical, and spherical.

12. The microlaser in claim 8, wherein both surfaces of the saturable absorber are symmetrical about a plane normal to the optical path.

13. The microlaser in claim 1, wherein the gain medium has a first and a second surface, both of which are intersected by the laser beam.

14. The microlaser in claim 13, wherein one of the gain medium surfaces is off normal to the laser beam by an angle of between 1.4 and 45 degrees.

15. The microlaser in claim 13, wherein both of the gain medium surfaces are not normal to the laser beam.

16. The microlaser in claim 13, wherein one of the surfaces of the gain medium is one of planar, cylindrical and spherical.

17. The microlaser in claim 13, wherein both surfaces of the gain medium are symmetrical about a plane normal to the optical path.

18. The microlaser in claim 1, wherein the saturable absorber medium and the gain medium are bonded at a common interface.

19. A method for controlling output parameters of the microlaser in claim 1 comprising the steps of:
   e) applying pump laser energy to the input port so that the gain medium is energized to produce a lasing beam which oscillates between the first and second mirrors;
   f) by means of a linear translation stage displacing the input port with respect to the monolithic resonant cavity along a direction approximately parallel to the first mirror; and
   g) collecting a laser output beam at the second minor wherein the desired output parameters are adjusted by positioning the linear translation stage.

* * * * *

UNITED STATES PATENT AND TRADEMARK OFFICE
CERTIFICATE OF CORRECTION

PATENT NO. : 8,031,749 B2
APPLICATION NO. : 11/532697
DATED : October 4, 2011
INVENTOR(S) : Feve et al.

It is certified that error appears in the above-identified patent and that said Letters Patent is hereby corrected as shown below:

Claim 1, column 12, line 9, "the second minors substantially" should read -- the second mirrors substantially --

Claim 4, column 12, line 28, "the second minor." should read -- the second mirror. --

Claim 6, column 12, line 33, "wherein the first minor is" should read -- wherein the first mirror is --

Claim 19, column 14, line 1, "at the second minor" should read -- at the second mirror --

Signed and Sealed this
Fifteenth Day of January, 2013

David J. Kappos
*Director of the United States Patent and Trademark Office*